C. L. TAYLOR.
ELECTRIC CONTROLLER.
APPLICATION FILED MAR. 6, 1909.
942,981.
Patented Dec. 14, 1909.
9 SHEETS—SHEET 1.
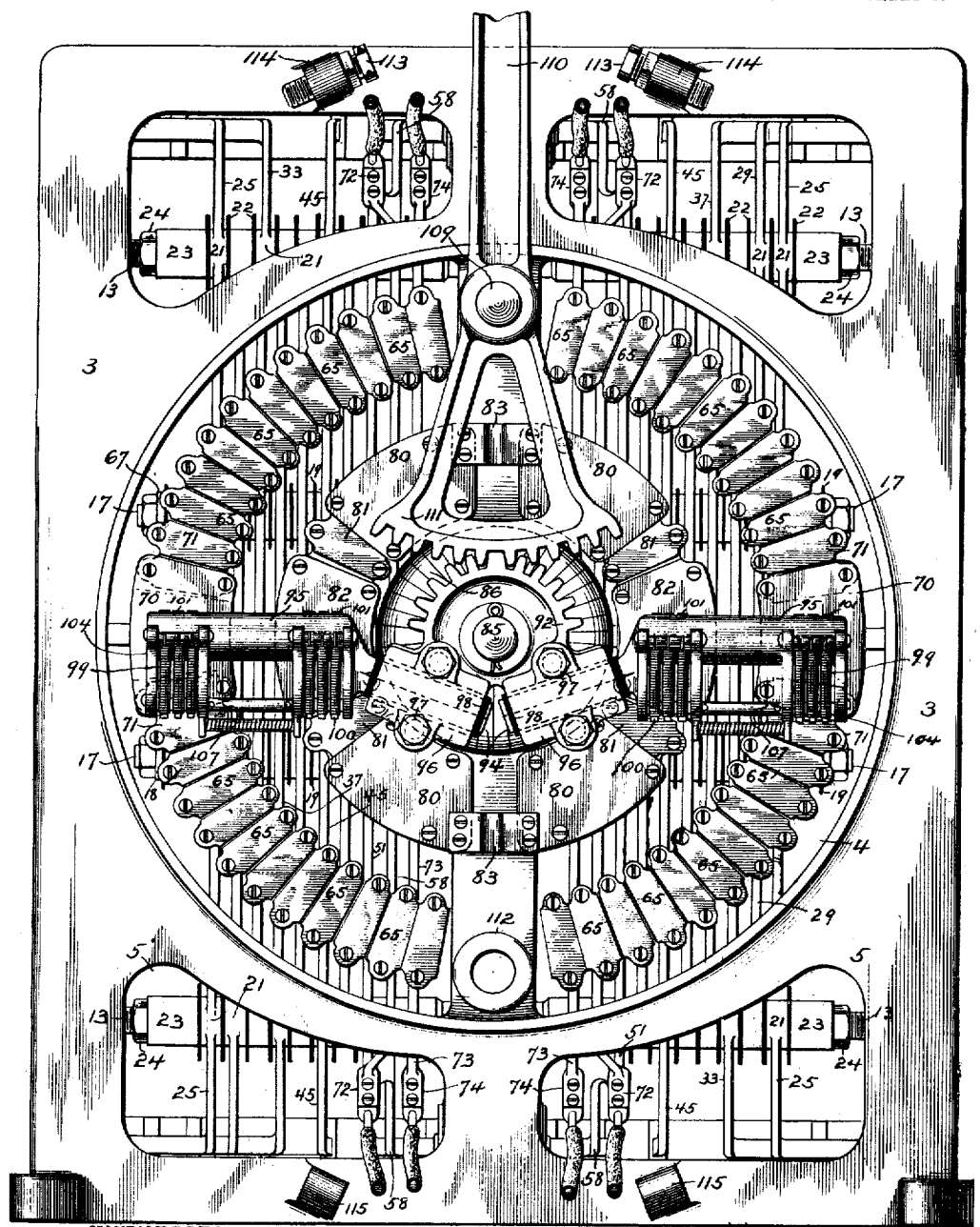

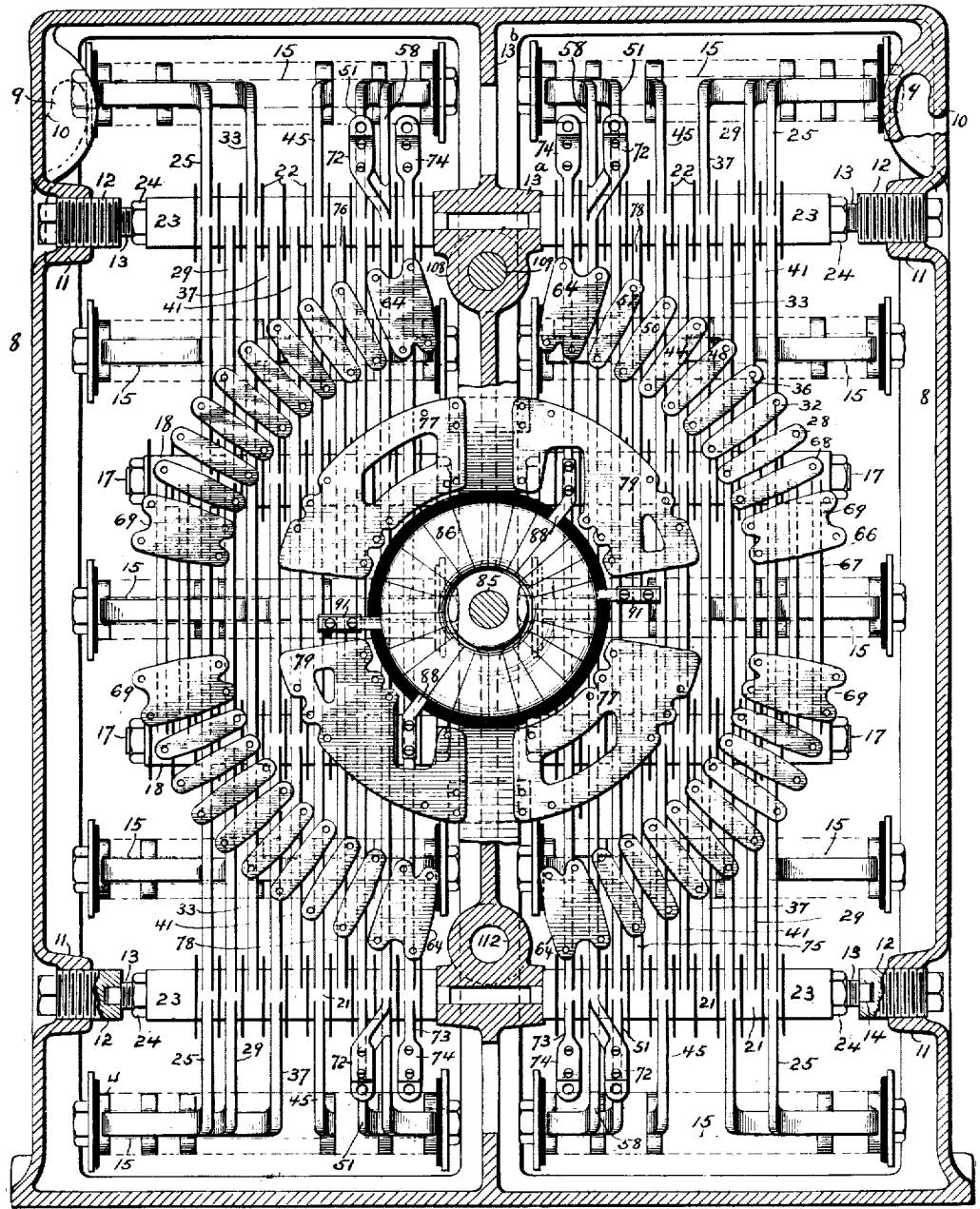

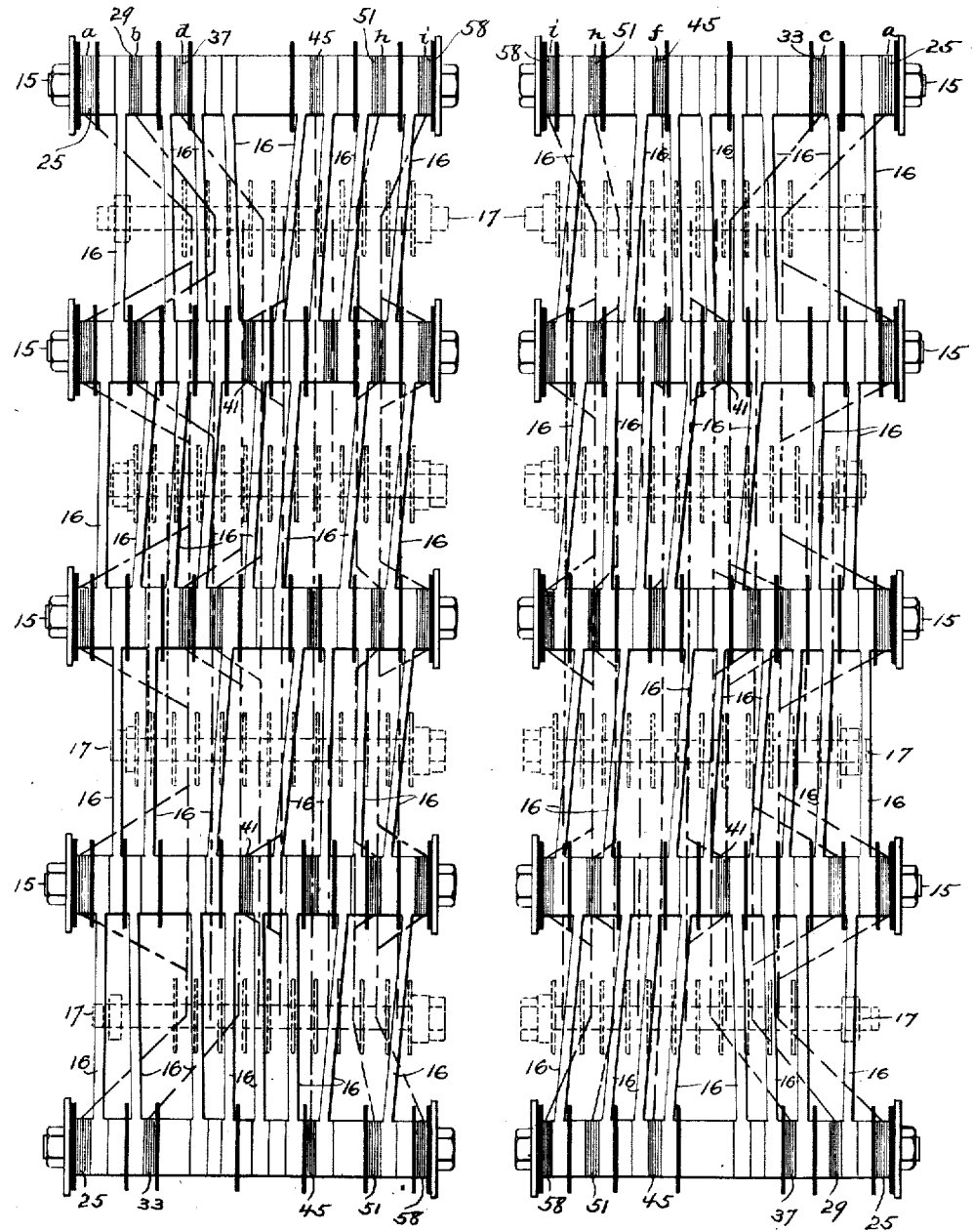

C. L. TAYLOR.
ELECTRIC CONTROLLER.
APPLICATION FILED MAR. 6, 1909.
942,981.
Patented Dec. 14, 1909.
9 SHEETS—SHEET 4.
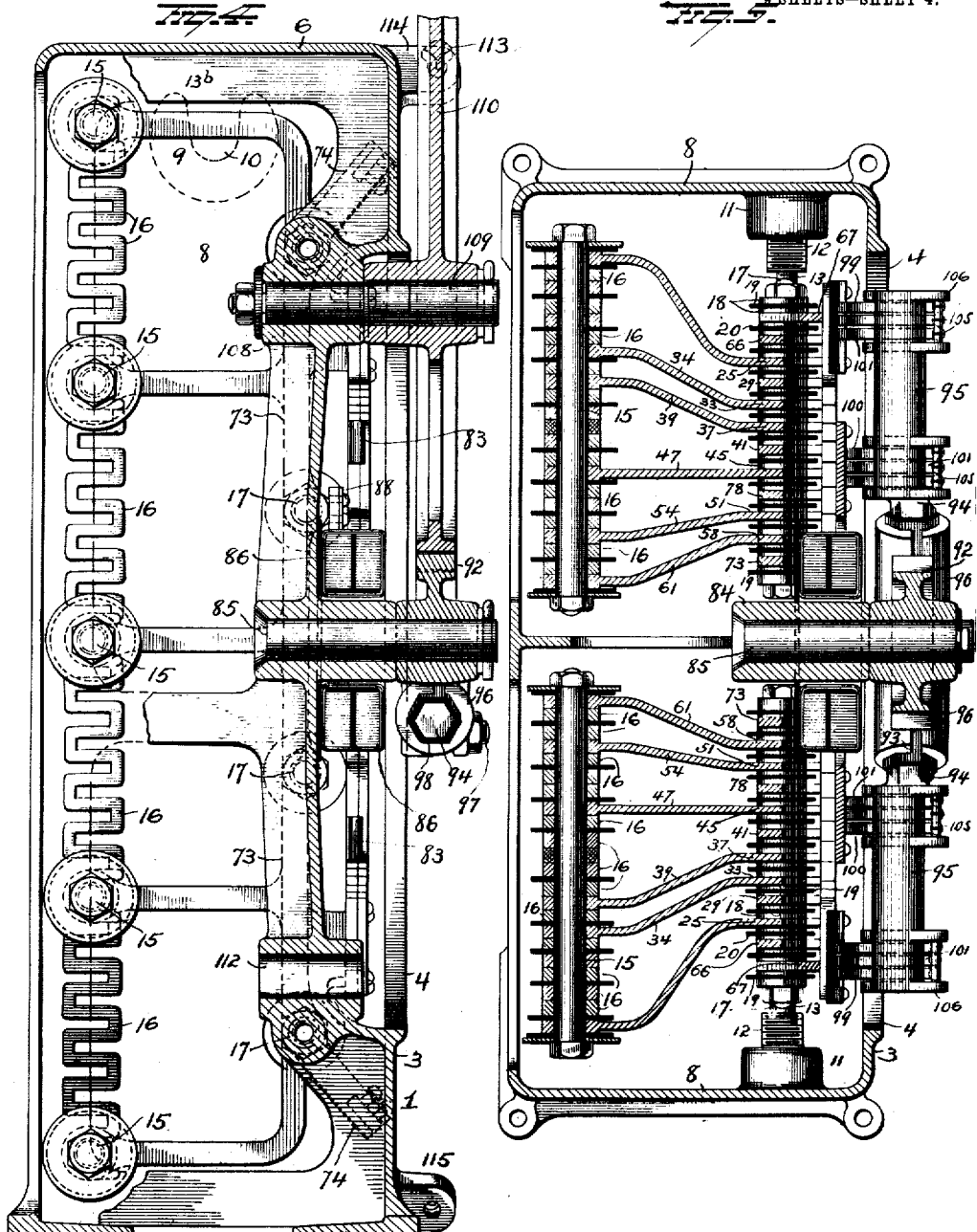
WITNESSES
INVENTOR
C. L. Taylor
Attorney

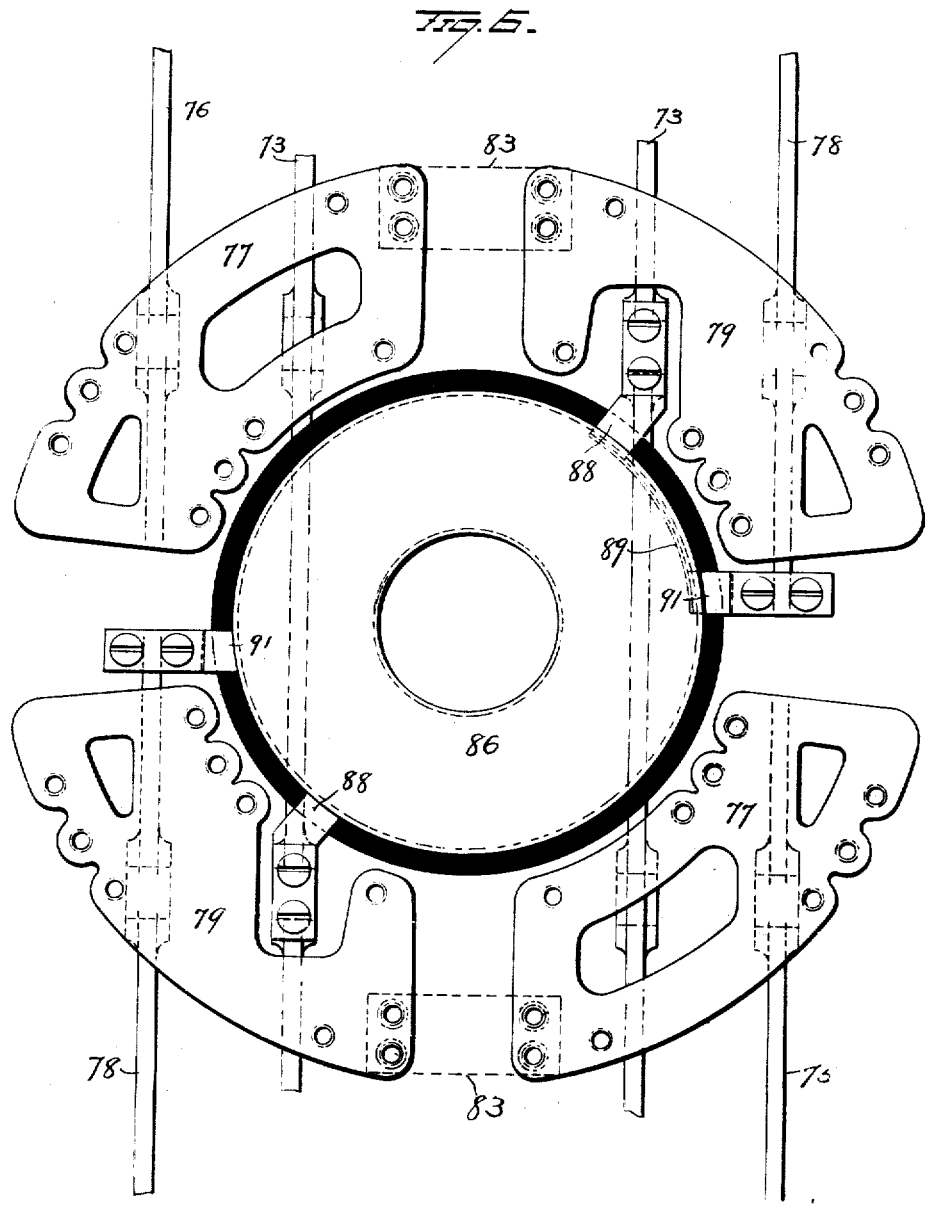

C. L. TAYLOR.
ELECTRIC CONTROLLER.
APPLICATION FILED MAR. 6, 1909.
942,981.
Patented Dec. 14, 1909.
9 SHEETS—SHEET 6.
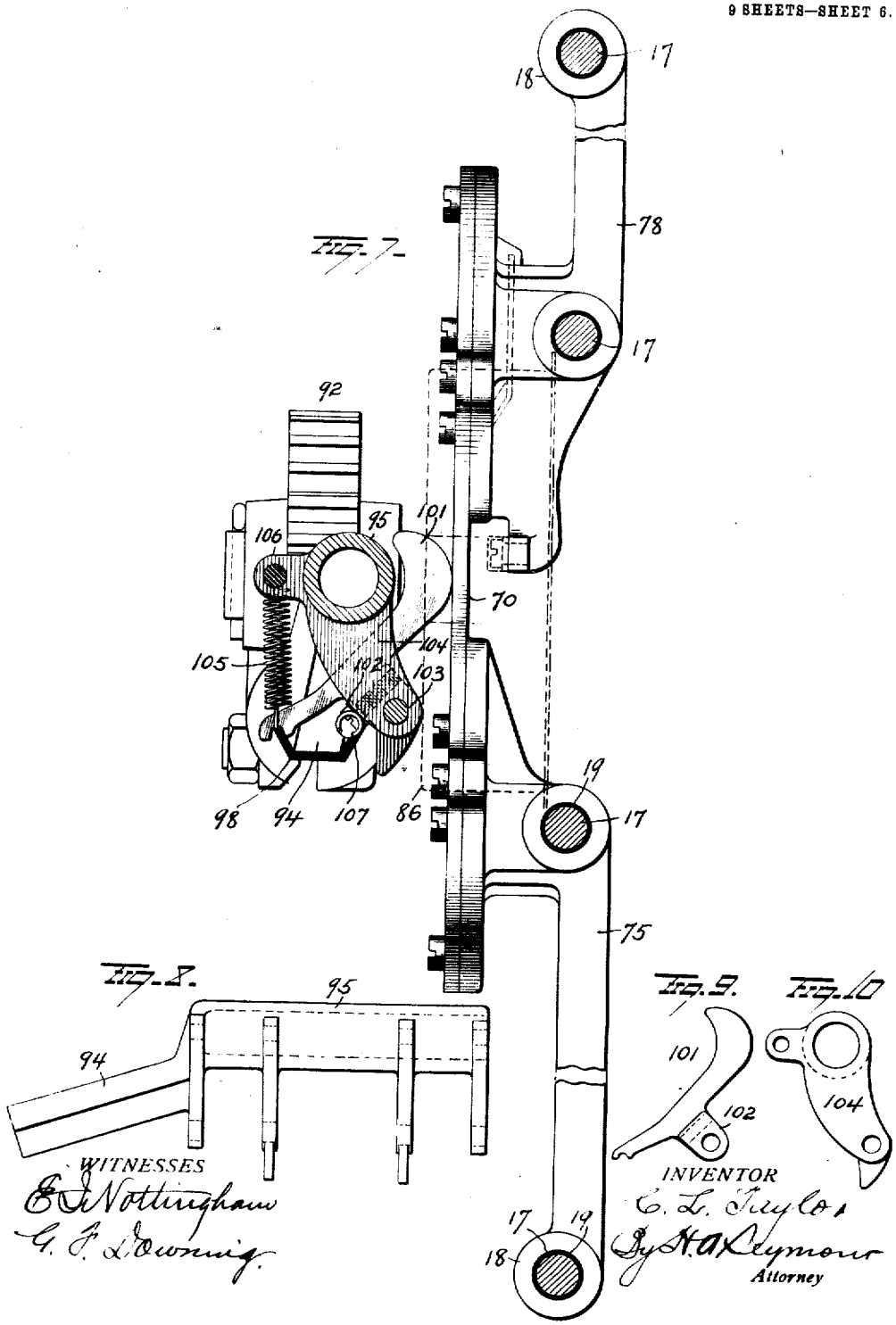

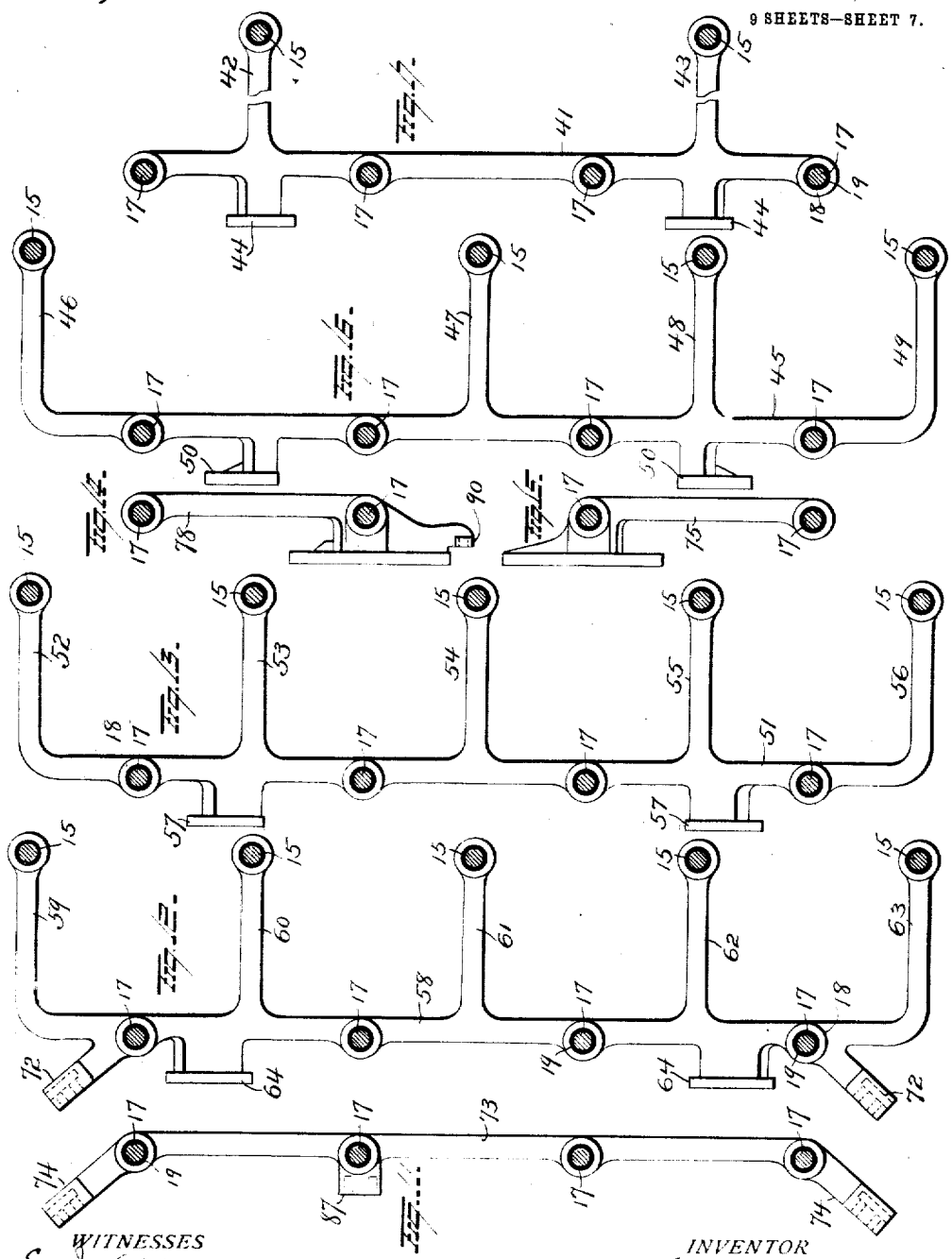

C. L. TAYLOR.
ELECTRIC CONTROLLER.
APPLICATION FILED MAR. 6, 1909.
942,981.
Patented Dec. 14, 1909.
9 SHEETS—SHEET 8.
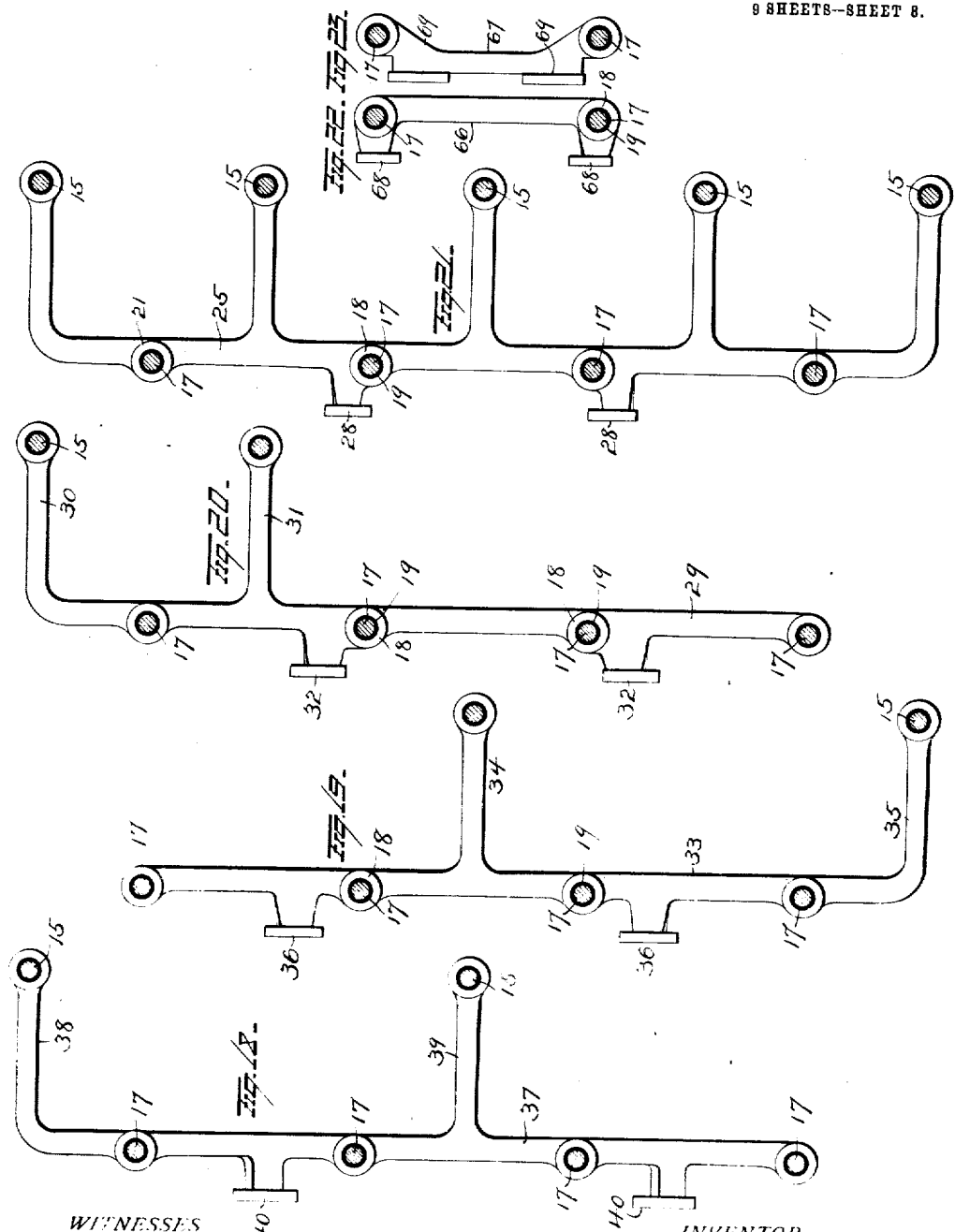

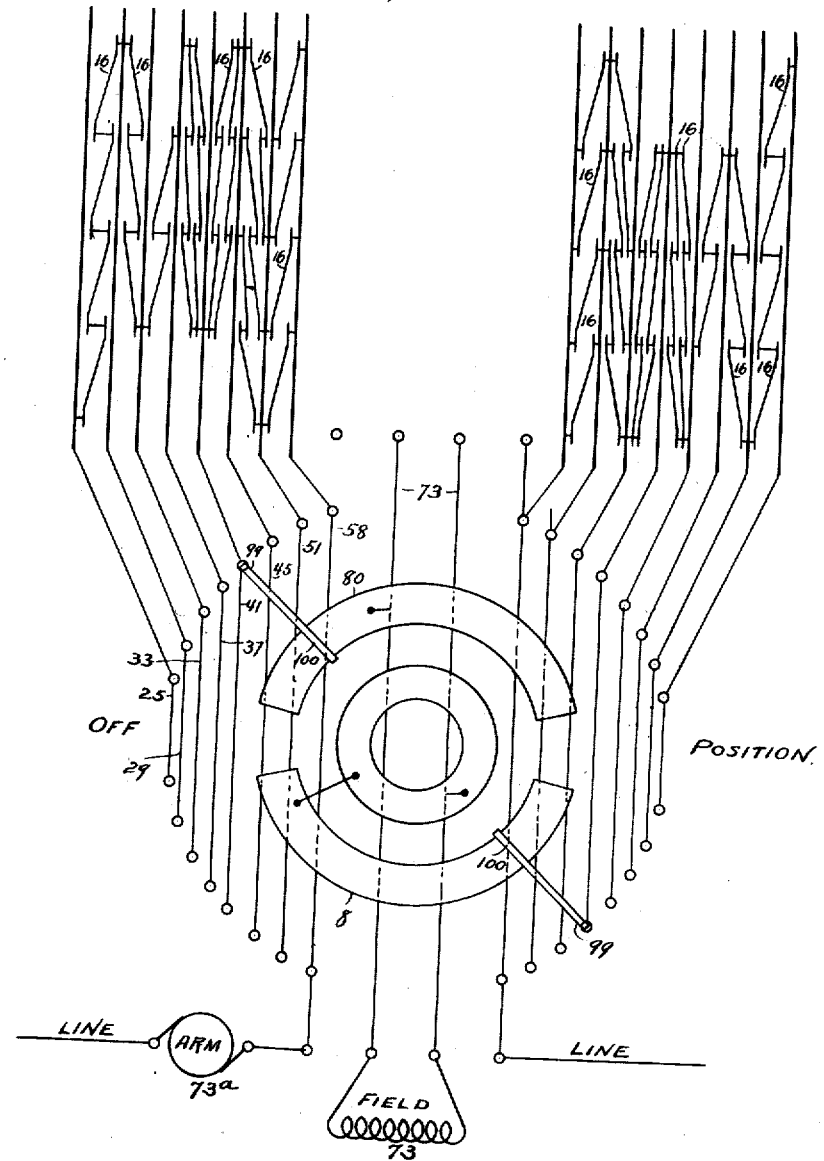

UNITED STATES PATENT OFFICE.

CLARENCE L. TAYLOR, OF ALLIANCE, OHIO, ASSIGNOR TO THE MORGAN ENGINEERING COMPANY, OF ALLIANCE, OHIO.

ELECTRIC CONTROLLER.

942,981.

Specification of Letters Patent. Patented Dec. 14, 1909.

Application filed March 6, 1909. Serial No. 481,656.

*To all whom it may concern:*

Be it known that I, CLARENCE L. TAYLOR, of Alliance, in the county of Stark and State of Ohio, have invented certain new and useful Improvements in Electric Controllers; and I do hereby declare the following to be a full, clear, and exact description of the invention, such as will enable others skilled in the art to which it appertains to make and use the same.

This invention relates to improvements in electrical controllers and more particularly to such as are adapted to control the operation of the electric motors of overhead traveling cranes.

One object of the invention is to so construct an electrical controller that it can be readily assembled and so that parts thereof can be easily removed when broken or impaired and replaced by new parts without disassembling any considerable portion of the machine.

A further object is to construct an electrical controller in such manner that the use of wire connections within the machine shall be avoided, and so that the electrical connections shall be formed by rigid elements which constitute portions of the mechanical structure.

With these and other objects in view, the invention consists in certain novel features of construction and combinations of parts as hereinafter set forth and pointed out in the claims.

In the accompanying drawings; Figure 1 is a front elevation of a controller embodying my improvements; Fig. 2, front view, with the frame in section and the contact blocks and brushes with their operating mechanism removed; Fig. 3 is a rear view, omitting the frame, with the resistance elements and their supporting means shown diagrammatically; Fig. 4 is a transverse vertical sectional view of the controller; Fig. 5 is a horizontal sectional view; Fig. 6 is an enlarged face view showing blow-out coil; central contact block supports; means for supporting the latter, and the electrical connections for the blow-out coil; Fig. 7 is an enlarged detail view showing the coöperation of one of the brushes with one of the central contact blocks or plates, and the supporting means for such parts; Figs. 8, 9 and 10 are detail views of one of the brushes; Figs. 11 to 23 inclusive are views of the bars which constitute the supports for the contact blades and resistance elements and the various electrical connections; and Fig. 24 is a diagrammatical view of the circuits.

1 represents the frame of the controller and may be made in a single casting having its back entirely open as shown at 2 and provided in its front 3 with a large circular opening 4 and with smaller openings 5. The top of the frame may be closed and the bottom 7 open. The sides of the casing are closed and provided near their upper ends with depressions 9 forming hooks or lugs 10 for the attachment of hoisting means whereby the controller can be elevated to position in the case of a traveling crane or other place where it is to be used.

Near the top and bottom of each side 8 of the casing, threaded bosses 11 are provided for the reception of studs 12 in which the outer ends of transverse shafts 13—14 are mounted so as to be removable the inner ends of said shafts being mounted in bearings formed by bosses 13$^a$ on the vertical web 13$^b$ of the frame. These shafts serve to sustain the resistance frame by which the resistance elements and contact blocks are supported.

The resistance frame above referred to comprises a number of vertically disposed bars, preferably made of iron or steel, and these bars are duplicated at respective sides of the vertical center of the frame. The bars of the resistance frame are provided with rearwardly projecting arms having bosses at their free ends for the accommodation of superimposed shafts 15 from which they are suitably insulated, and between these superimposed shafts, resistance elements, in the form of grids 16 are arranged in rows, each grid having hook-shaped ends for mechanical but not electrical connection with said shafts 15.

As the bars constituting the resistance frame are disposed at respective sides of the vertical center of the frame, two banks of resistance elements, are employed, and a detail description of one set of supporting bars and one bank of resistance elements will suffice for both. In the construction shown in the drawing, five superimposed shafts 15 are employed, and the various vertical bars of each set, are braced by horizontal shafts 17 (two for each set of bars) which pass through perforated bosses 18 on the bars, the latter being electrically separated from the shafts by means of insulating material 19 and prevented from lateral displacement by means of insulating washers 20. The various bars and spacing washers are clamped on the shafts 17 by means of nuts 18 screwed on the respective ends of the same. The various vertical bars are also provided with bosses 21 for the accommodation of the supporting shafts 13—14, the bars being insulated from said shafts and washers 22 serve to electrically separate said bars from each other.

Suitable spacers 23 may be placed upon the supporting shafts and the bars and interposed insulating washers are clamped where the shafts 13—14 pass through them, by means of nuts 24.

Referring now to the right hand series of vertical bars (Fig. 2) of the resistance frame, the first bar 25 is provided with five rearwardly projecting arms 26 having bosses 27 at their free ends for the accommodation of the several shafts 15, from which latter they are electrically separated. The lower arm of bar 25 is electrically connected with the lower end of the lower resistance grid 16 of the first vertical series of grids, and all of the grids of this vertical tier are electrically connected in series. The bar 25 is also provided with seats 28 for the reception of contact blocks as hereinafter explained.

The next vertical bar 29 is provided with arms 30—31 extending to the upper two horizontal shafts 15, the arm 30 being electrically connected with the upper grid of the first tier and the arm 31 being electrically connected with the second grid of the second tier of grids. The remaining grids of the second tier are electrically connected in series. The bar 29 is provided with seats 32 for contact blocks. The next vertical bar 33 is provided with two arms 34—35 extending respectively, to the central and lower shafts 15. The arm 34 is electrically connected with the lower grid of the second tier and the arm 34 is electrically connected with the second grid of the third tier of grids. The bar 35 is provided with seats 36 for contact blocks. The next vertical bar 37 is provided with arms 38—39 extending to the upper and central shafts 15. The arm 38 is electrically connected with the upper grid of the second tier, while the arm 39 is electrically connected with two grids at the central shaft 15. The bar 37 is provided with two seats 40 for contact blocks.

The vertical bar 41 is provided with two arms 42—43 extending to the second and fourth shafts 15, the arm 42 being electrically connected with grids of the upper two horizontal rows while the arm 43 is electrically connected with two grids of the bottom row. The bar is provided with seats 44 for contact blocks.

The vertical bar 45 is provided with four arms 46—47—48 and 49. The arm 46 extends to the top shaft 15 and is electrically connected with the upper ends of two grids of the upper row; the arm 47 is electrically connected with the upper end of a grid of the third row; the arm 48 is electrically connected with the lower end of another grid of the third row, and the arm 49 is electrically connected with the lower end of a grid of the bottom row. The bar 45 is provided with seats 50 for contact blocks.

The vertical bar 51 is provided with five arms 52, 53, 54, 55, 56, extending to the various shafts 15. The arm 52 is electrically connected with one grid of the upper rod; the arm 53 is electrically connected with the lower end of a grid of the upper row and the upper end of a grid of the second row; the arm 54 is electrically connected with the lower end of a grid of second row and the upper end of a grid of the third row; the arm 55 is electrically connected with the lower end of the grid of the third row, and the arm 56 is electrically connected with the lower end of a grid of the fourth row. The bar 51 is provided with seats 57 for contact blocks.

The bar 58 is provided with five arms 59, 60, 61, 62 and 63, the arms 59, 60, 61 and 62 being electrically connected with the upper end of one grid of each of the four horizontal rows of grids. The bar 58 is provided with seats 64 for contact blocks.

It will be observed from an inspection of Fig. 3 of the drawing, that the ends of those grids which are not electrically connected with arms of the vertical bars constituting the resistance frame, are electrically connected with their neighbors on one side thereof.

The arrangements of the resistance frame and resistance elements above described are those at the right hand side of the center of the controller. It is apparent that the arrangement at the left hand side is just the reverse to that above described in detail.

With the arrangement of the component parts of the resistance frame and the resistance elements, as hereinbefore described, the resistance elements are arranged in two groups as illustrated in Fig. 3, and that two sets of cross-connected contact terminals are provided for each group. As more clearly illustrated in the diagram, Fig. 24, it will be observed that the resistance grids are so arranged that those first cut-out of the circuit during the operation of the controller to start the motor, are arranged in series, and that the remainder of the resistance grids are arranged in parallel.

The seats for contact blocks 65 on the various bars of the resistance frame are so disposed that said contact blocks will be in segmental formation as shown in Fig. 1. Two short bars 66, 67, provided with seats 68—69 are mounted on the shafts 17 at each side of the resistance frame, for supporting certain dead contact blocks 70—71, in order that movable brushes (hereinafter described) can sweep over them from one series of active resistance contacts to another, or so that said brushes can be disposed between the sets of resistance contacts, when it is desired that the circuit of the motor shall be open.

Each of the vertical bars 58 is provided near each end with a binding post 72 for the attachment of one terminal of the armature 73$^a$ of an electric motor and the line, as shown in Fig. 24.

Adjacent to the vertical bars 58, vertical bars 73 are located at respective sides of the central web 13$^b$ of the frame 1, and provided at their respective ends with binding posts 74 for the terminals of the field coils 73$^b$ of the motor as shown in Fig. 24.

Binding posts are provided at both ends of each of the bars 58 and 73, so that the wire terminals can be brought into either the top or the bottom of the controller as occasion may require.

At one side of the vertical center of the frame, a bar 75 is mounted on the shaft 14 and one of the shafts 17, and at the other side of the center of the frame, a bar 76 is mounted on the shaft 13 and the other shaft 17. Each of these bars 75 and 76 supports an elongated segmental plate 77, said plates being so disposed as to mark segments of the same circle, and constituting seats for contact blocks or plates.

Vertical bars 78—78 are mounted at respective sides of the central web of the frame on the shafts 13—17 and 14—17 respectively and support elongated segmental plates 79 disposed concentric and alternating with the plates 77, and also constituting seats for contact plates or blocks. Elongated contact blocks 80 are secured to each of the plates 77 and 79 and at one end of each of said contact blocks, smaller contact blocks 81 are secured to said plates 77 and 79. Contact blocks 82 connect the lower ends of the plates 77 and 79, while the upper ends of said plates are electrically connected together as shown at 83.

The vertical web 13$^b$ of the frame is provided centrally between its ends with a hub 84 in which a short shaft 85 is located and affords a mounting for the brushes of the controller. In order that the iron frame shall be magnetized and thus provide magnetic paths between the various contact blocks for the purpose of extinguishing sparks caused by the passage of the brushes from one contact block to another, a blow-out coil 86 is made to encircle the hub 84. This coil may be supported by its connection with the vertical bars 73 and 78 as shown in Fig. 6. To afford such support and also electrical connections for the blow-out coil, the bars 73 are provided with seats 87 for the reception of arms 88 and one of the latter is electrically connected with a strip 89 located within the insulating covering of the blow out coil and electrically connected with the terminals of the latter. The bars 78 are also provided with seats 90 to which arms 91 are secured, one of said arms being also electrically connected with the strip 89 within the covering of the blow-out coil. With such arrangement, the blow-out coil will always be in series in the circuit, as will be more fully hereinafter explained in tracing the circuits through the controller.

A segmental gear 92 is mounted on the projecting end of the short shaft 85 and is provided with recessed enlargements 93 for the reception of the arms 94 of brush holders 95, said arms 94 being clamped to the enlargements 93 by means of plates 96 and bolts 97. Suitable insulating material 98 is disposed between the arms 94 of the brush holders and the enlargements 93 and plates 96.

Each brush holder 95 carries two brushes 99 and 100, the brush 99 being adapted to ride over the contact blocks connected with the resistance elements, and the brush 100 being adapted to ride over the centrally disposed elongated contact blocks.

Each brush comprises a series of fingers or brushes 101 having curved contact edges to engage and ride over the contact block. The fingers 101 are provided between their ends with lugs 102 pivotally supported on shafts 103 supported in arms 104 of the brush holders. Springs 105 are connected at one end to the upper ends of the fingers or brushes 101 and at their other end to lugs 106 of the brush holders, and serve to press the curved engaging faces of said fingers or brushes properly against the contact blocks.

The tubular brush holders will afford electrical connection between the brushes on each holder, but to relieve said holders of the entire burden of carrying the entire current, each pair of brushes 99—100 are electrically connected by means of a flexible conductor 107.

A perforated boss 108 is provided in the upper portion of the central web 13$^b$ of the frame and in this boss, a short shaft 109 is secured. An operating lever 110 is mounted between its ends on the shaft 109 and provided at its lower end with a toothed segment 111 which meshes with and transmits motion to the segmental gear 92. By means of this lever, motion is transmitted to the switch arm, the latter comprising the two brush holders and their connection with the segmental gear. A perforated boss 112 is also provided in the lower portion of the central web 13$^b$ for the reception of the shaft 109, should it be desired to mount the lever on the lower portion of the frame and permit to hang below the latter so that it can be operated from below instead of from above the machine.

Adjustable stops 113 for the lever are supported by bosses 114 on the upper portion of the frame, and similar bosses 115 are located on the lower portion of the frame for the reception of the stops when the operating lever is mounted on the lower portion of the frame.

When the switch arm is disposed as shown in Fig. 1, the circuit through the motor will be open, as the brushes 99 are rested on the dead contact blocks 70 which are insulated from their supports. When the lever is operated to swing the brushes in either direction from the position shown in Fig. 1 so as to cause them to pass over the live contact blocks, the circuit will be closed through the resistance and the armature of the motor and in one direction or the other through the field coils of the motor.

When the switch brushes are moved to the positions indicated in the diagram, Fig. 24, the circuit may be traced as follows:—From the line, through the armature of the motor to one of the bars 58 of the resistance frame; thence through a portion of the resistance of the bank indicated at the left of Fig. 24; thence through two of the brushes 99—100 to one of the central contact blocks 80; thence by the connector 83 to the adjacent contact block 80; from the latter to its seat 79; thence by arm 91 to conducting strip 89 within the wrapping of the blow-out coil; from said strip, by way of arm 88 to one of the vertical bars 73; thence through the field of the motor to the other vertical bar 73; from the latter to one terminal of the blow-out coil; from the other terminal of the said coil to the bar 78 and seat 79 thereon; thence to lower contact block 80 on seat 79; thence by connector 83 to adjacent contact block 80; thence through the lower brushes 100—99 and their holder to one of the bars of the resistance frame; thence through a portion of the resistance of the right hand bank shown in Fig. 24, and thence by the right hand bar 58 to the line.

It is apparent that if the switch arm be moved in the reverse direction from that shown in Fig. 24, the current will pass in the same direction as above described through the armature of the motor and the resistance elements as above described, but that its direction through the field coil will be reversed and hence the running of the motor will be reversed. Thus, from the connections shown in the diagram, it will be observed that with the brushes arranged as there shown, the circuit will be traced from one bank of resistance elements through the field coil and then through the blow out coil, while a reverse arrangement of the brushes would cause the circuit to be traced first through the blow out coil and then through the field coil of the motor.

Having fully described my invention what I claim as new and desire to secure by Letters-Patent, is:—

1. In an electric controller, the combination with a frame, of a series of conducting bars supported therein and provided with arms, and resistance elements sustained by said arms.

2. In an electric controller, the combination with a frame, of a series of conducting bars supported therein and provided with rearwardly projecting arms, resistance elements supported by said arms, and contact blocks carried by the front faces of said conducting bars.

3. In an electric controller, the combination with a frame, of a series of conducting bars supported therein and provided with seats for contact blocks, contact blocks secured to said seats, and resistance elements electrically connected with said bars and mechanically supported thereby.

4. In an electric controller, the combination with a frame, of a series of rigid bars, means for removably supporting said bars within the frame, and resistance elements removably supported by and spaced rearwardly from said bars and electrically connected therewith.

5. In an electric controller, the combination with a frame, of shafts removably mounted therein, a series of conducting bars supported by and spaced rearwardly from said shafts, and resistance elements supported by said bars.

6. In an electric controller, the combination with a frame, of threaded studs in the sides of said frame, shafts mounted in said studs and in the central portion of the frame, conducting bars supported by said shafts, and resistance elements supported by and electrically connected with said bars.

7. In an electric controller, the combination with a frame, of shafts mounted therein, fixed bars supported by said shafts and electrically separated therefrom, shafts passing through the bars at intermediate points and electrically separated therefrom, means on all of said shafts for holding the bars against lateral displacement, and resistance elements supported by said bars.

8. In an electric controller, the combination with a frame, of rigid bars supported therein, shafts supported by said bars, and a bank of resistance elements supported by said shafts and electrically connected with the bars.

9. In an electric controller, the combination with a frame, of a series of rigid bars supported therein and provided with arms, shafts supported by the free ends of said arms, resistance elements removably supported by said shafts and electrically connected with the arms of said bars.

10. In an electric controller, the combination with a frame and a series of rigid conducting bars supported therein, of shafts supported by said bars, resistance elements consisting of removable grids having hook-shaped ends embracing said shafts and electrically connected with the rigid conducting bars.

11. An electric resistance device comprising a plurality of units, each embodying a rigid bar of conducting material, and a resistance element spaced from said bar, supported thereby and electrically connected with said bar.

12. An electric resistance device comprising a plurality of units, each embodying a rigid conducting bar, a contact device for a switch element supported on the front of said bar, and a resistance element supported by said bar rearwardly of the same and electrically connected therewith.

13. In an electric controller, the combination with a frame, of a plurality of vertical bars rigidly secured within said frame, each of said bars provided on its front face with contact devices for a switch element, and resistance elements supported by said bars rearwardly of the same and electrically connected therewith.

14. In an electric controller, the combination with a plurality of bars supported rigidly within said frame, a plurality of resistance elements supported by said bars and electrically connected therewith, and two contact devices for a switch element, carried by each of said bars, whereby said contact devices are electrically cross connected and also electrically connected with the resistance elements.

15. In an electric controller, the combination with a frame, of two series of bars rigidly supported within said frame, two banks of resistance elements supported by the respective series of bars and electrically connected with the same, each of said bars having two contact devices for switch elements, whereby two cross-connected contact devices of each series of bars are connected with the resistance elements of the respective banks, and means for interposing one element of an electric motor in circuit in series with and between resistance elements of the two banks.

16. In an electric controller, the combination with a frame, of two series of bars rigidly secured therein and provided with contact devices for switch elements, two banks of resistance elements supported by and electrically connected with said bars, other rigidly supported bars provided with contact devices for switch elements, means for electrically connecting the terminals of one element of a motor with the last mentioned bars, means for electrically connecting one of the first mentioned series of bars with the other element of the motor, means for connecting one bar of the other first-mentioned series with the line circuit, and movable switch devices coöperating with the various contact devices, whereby one element of the motor can be included in series between the two banks of resistance elements and the current caused to pass in either direction through said element of the motor.

17. In an electric controller, the combination with a frame, and a plurality of bars rigidly supported therein contact devices for switch elements electrically connected with said bars, resistance elements supported by some of said bars, binding posts on two of said bars for connection of motor and line terminals, and binding posts on two other bars for the terminals of one element of the motor, and movable switch elements coöperating with the contact devices of the various bars.

18. In an electric controller, the combination with a main frame, a resistance frame comprising iron bars supported in the main frame, resistance elements supported by the bars of the resistance frame, contact devices carried by said iron bars, a movable switch element coöperating with said contact devices, and a blow out coil for magnetizing said resistance frame for extinguishing arcs between the contact and switch element.

19. In an electric controller, the combination with a frame, of a plurality of bars supported in said frame and carrying contact devices, resistance elements supported by said bars, a switch element coöperating with said contact devices, and means for magnetizing said bars.

20. In an electric controller, the combination with a frame, of a plurality of bars supported therein, resistance elements supported by and electrically connected with said bars, contact devices carried by said bars, a switch element mounted centrally on the frame and coöperating with said contact devices, a centrally located blow-out coil for magnetizing said bars, and means for including said coil in the circuit of the controller.

21. In an electric controller, the combination with a frame, of a series of bars supported in said frame, a plurality of resistance elements supported by and electrically connected with certain of said bars, the latter provided with contact devices for switch elements, elongated contact devices supported by other of said bars, switch elements to pass over said contact devices, a centrally located blow-out coil for magnetizing said bars, and means for including said blow-out coil in circuit with the elongated contacts.

22. In an electric controller, the combination with a frame having open front and back, of a series of bars removably supported within said frame adjacent to the front thereof, said bars provided with contact devices for a switch element and also provided with rearwardly projecting arms, a series of superimposed shafts supported by the rear ends of said arms, and a plurality of resistance elements removably supported by said shafts near the open back of the frame and electrically connected with the arms of said plurality of bars.

23. In an electric controller, the combination with an open frame provided in its sides with depressions and having integral hooks or projections in line with said depressions, of a plurality of resistance elements, bars secured in the frame and supporting said resistance elements, contact devices on said bars, a switch arm, a lever pivoted to the frame, gearing between the switch arm and lever, and adjustable stops on said frame for the lever.

24. The combination with the frame and contact blocks of an electric controller, of a segmental gear mounted on the frame and provided with integral arms, two brush holders having shanks clamped to and insulated from the integral arms on the segmental gear, brushes carried by said brush holders, and a lever provided with a toothed segment meshing with the segmental gear.

In testimony whereof, I have signed this specification in the presence of two subscribing witnesses.

CLARENCE L. TAYLOR.

Witnesses:
N. C. FETTERS,
ROBT. C. HOPKINS.